(12) United States Patent  (10) Patent No.: US 8,442,605 B2
Willen et al.  (45) Date of Patent: May 14, 2013

(54) POWER CABLE COMPRISING HTS TAPE(S)

(75) Inventors: Dag Willen, Klagshamn (SE); Chresten Traeholt, Frederiksberg (DK); Carsten Thidemann Nielsen, Jaegerspris (DK)

(73) Assignee: NKT Cables Ultera A/S, Asnaes (DK)

( * ) Notice: Subject to any disclaimer, the term of this patent is extended or adjusted under 35 U.S.C. 154(b) by 633 days.

(21) Appl. No.: 12/602,875

(22) PCT Filed: Jun. 4, 2008

(86) PCT No.: PCT/DK2008/000208
§ 371 (c)(1),
(2), (4) Date: Mar. 17, 2010

(87) PCT Pub. No.: WO2008/148390
PCT Pub. Date: Dec. 11, 2008

(65) Prior Publication Data
US 2010/0179064 A1    Jul. 15, 2010

(30) Foreign Application Priority Data
Jun. 4, 2007  (DK) .................. 2007 00815

(51) Int. Cl.
*H01B 12/00* (2006.01)
(52) U.S. Cl.
USPC ........................................................ 505/230
(58) Field of Classification Search .................. 505/163, 505/230, 886; 174/15 S
See application file for complete search history.

(56) References Cited

U.S. PATENT DOCUMENTS

| | | |
|---|---|---|
| 6,596,945 B1 | 7/2003 | Hughey et al. |
| 6,684,486 B1 | 2/2004 | Willen |
| 6,750,399 B1 | 6/2004 | Daumling |
| 6,864,430 B2 | 3/2005 | Hughey et al. |
| 6,867,375 B2 | 3/2005 | Hughey et al. |
| 6,936,772 B2 | 8/2005 | Hughey et al. |
| 6,972,376 B2 | 12/2005 | Hughey et al. |
| 2003/0062659 A1 | 4/2003 | Huang et al. |
| 2005/0159298 A1 | 7/2005 | Rupich et al. |
| 2006/0040830 A1 | 2/2006 | Thieme et al. |
| 2006/0073979 A1 | 4/2006 | Thieme et al. |

FOREIGN PATENT DOCUMENTS

| | | |
|---|---|---|
| DE | 4446529 A1 | 6/1996 |
| EP | 0339800 A2 | 11/1989 |
| EP | 1053193 A1 | 11/2000 |
| WO | 0225672 A2 | 3/2002 |
| WO | 2004013868 A2 | 2/2004 |
| WO | 2006111170 A2 | 10/2006 |

*Primary Examiner* — Colleen Dunn
(74) *Attorney, Agent, or Firm* — Pearne & Gordon LLP (57) ABSTRACT

The invention relates to power cable comprising, at least one HTS-tape and a cooling system comprising a fluid cooling medium for cooling the at least one HTS-tape. The at least one HTS-tape being at least partly surrounded by a cooling layer comprising said fluid cooling medium and an electrical insulation at least partly impregnated with said fluid medium.
The power cable of the invention has shown to reduce the risk of fault current and electrically breakdown. When extra cooling is needed for stable operation the cooling medium may evaporate in the cooling layer for providing the cooling.

33 Claims, 5 Drawing Sheets

POWER CABLE COMPRISING HTS TAPE(S)

TECHNICAL FIELD

The invention relates to a power cable comprising at least one High Temperature Superconducting tape

BACKGROUND ART

Power cable comprising HTS tapes are e.g. known from WO 2006/111170.

In general a superconducting power cable comprising HTS tapes must be kept at cryogenic temperatures (0-150 K or −273.25 to −123° C.) in order to function as intended/designed. Usually a cable section connects to other system components operated at ambient or elevated temperature.

Advantages of HTS cables over conventional cables with conductors of copper or aluminium include normally a higher current carrying capability, reduced generation and release of heat along the cable, lower electrical loss, and lower weight.

Disadvantages compared to the conventional alternatives may include the necessity of a cooling system, continuous thermal loss through the thermal insulation, and increased complexity of accessories such as joints and terminations.

DISCLOSURE OF INVENTION

The object of the invention is to provide an improved power cable, in particular a power cable with fault current limiting properties.

The inventors of the invention have thus observed that:
- Nitrogen bobbles in the insulation may lead to electrically breakdown
- Too low heat capacity in the HTS tapes may cause the tapes to burn and thereby electrically breakdown in the event of a fault
- Increased temperatures in the cable may cause the pressure to be too high eventually leading to electrically breakdown.
- A slight overload may force parts of the cable out of super conducting state. This can cause a local hot spot and electrically breakdown.

The power cable of the invention has shown to reduce the risk of fault current and electrically breakdown.

According to the invention it has been found that if evaporated nitrogen in prior art power cables is able to enter the impregnated electrical insulation, it may cause a breakdown in the electric insulation.

The power cable of the invention is as defined in the claim and as descried below.

According to one embodiment of the invention it has thus been found that a porous volume surrounding the HTS conductor will allow an amount of liquid cooling medium (e.g. nitrogen) to evaporate in order to use the evaporative enthalpy to protect the HTS tapes from overheating in the event of a fault. The porous volume material may in it self be an insulating, semi conducting, or conductive material and it is and surrounded by a semiconductor.

The power cable of the invention comprises, at least one HTS-tape and a cooling system comprising a fluid cooling medium for cooling the at least one HTS-tape. The HTS-tape is at least partly surrounded by a cooling layer comprising the fluid cooling medium and an electrical insulation at least partly impregnated with the fluid cooling medium.

By applying a cooling layer between the electrical insulation where both the cooling layer between the electrical insulation comprises fluid cooling medium the risk of electrically breakdown has shown to be highly reduced.

The power cable of the invention may in principle be any kind of power cable including AC and DC, comprising at least one HTS-tape and a cooling medium. Such power cables are often referred to as super conducting of hyper conducting cables. The power cable may for example be a multi-phased power cable or a single-phased power cable. Often it is desired that the power cable is a 1, 2, 3 or 4 phased power cable. Beyond the phases the power cable may further have one or more neutral phases, which are often referred to as "neutral". In order to optimize the cooling of the power cable it is often preferred that the power cable is a co-axial power cable, where the phases and neutral are arranged in a coaxial structure. In one embodiment the power cable has a cold-dielectric co-axial design. In one embodiment the power cable is a warm-dielectric single-phase cable. In one embodiment the power is a tri-axial cable design, i.e. three concentric phases centered around a carrier, former or similar and surrounded by a concentric electrical screen e.g. as described in WO06/111170, U.S. Pat. No. 6,750,399 and/or in EP1053193 which is modified by the feature of the invention including that at least one HTS-tape being at least partly surrounded by a cooling layer comprising said fluid cooling medium and an electrical insulation at least partly impregnated with said fluid medium.

The power cable of the invention may in one embodiment be as disclosed in WO 2006/111170 with the further addition that at least one HTS tape is surrounded with a material having a porous volume as described herein, e.g. a porous volume of at least 1% pores by vol., such as at least 5% pores by vol., such as at least 10% pores by vol., such as at least 25% pores by vol., such as at least 50% pores by vol. measured in uncompressed condition.

Normally the power cable will comprise a plurality of HTS-tapes which are arranged to provide a current path of at least one conductor. In other words the power cable comprises at least one conductor comprising said HTS-tape which is at least partly surrounded by a cooling layer comprising said fluid cooling medium and an electrical insulation at least partly impregnated with said fluid medium. Preferably the power cable comprises at least one conductor comprising a plurality of HTS-tapes which are at least partly surrounded by a cooling layer comprising said fluid cooling medium and an electrical insulation at least partly impregnated with said fluid medium.

When using the term "HTS-tape" in the following and in the claims it should be interpreted to mean "a HTS-tape, a plurality of HTS-tapes optionally arranged in a layer and/or a conductor comprising one or more HTS-tapes".

The HTS-tape may be a tape of ant kind of superconducting material and in particular high temperature superconducting material. Superconducting material is often also referred to as SC material.

Examples of high temperature superconductors materials include copper oxide superconductors such as bismuth strontium calcium copper oxide (BSCCO) and yttrium barium copper oxide (YBCO) type superconductors and others such as magnesium boride (MgB).

The, HTS tapes can for example be prepared using well-known conventional methods, for example, such as described in US Patent Publication No. 20030062659, which is hereby incorporated by reference herein in its entirety. For example, HTS tapes, such as BSCCO tapes, can be prepared by loading powders (either a precursor or the actual HTS powders) into a metallic (typically silver) tube, drawing the tube into a wire of smaller dimensions, repacking the wire into another metallic tube with other wires, drawing the repacked tube, and repeating the repacking and drawing step until at least one dimension of the drawn-down filament has obtained a desired dimension. Then, a rolling mill can be utilized to flatten the filament into a tape shape by passing the filament between a pair of counter-rotating high strength metal cylinders. Subsequently, a heat treatment step can be carried out to form the desired HTS tape.

In one embodiments, HTS tapes can be prepared as described using known methods, for example, such as those described in U.S. Patent Publication No. 2005/0159298, U.S. Patent Publication No. 2006/0040830, and U.S. Patent Publication No. 2006/0073979, which are hereby incorporated by reference herein in their entirety. For example, HTS tapes, such as YBCO tapes, can be prepared by preparing a flexible metal or metal alloy substrate having a desired texture, depositing a buffer layer on the substrate, depositing a YBCO precursor material on top of the buffer layer, heat treating the precursor material to form the YBCO HTS material, and depositing an overcoat of noble metal on top of the YBCO material.

The HTS tape(s) may in one embodiment be as described in WO 2006/111170.

In one embodiment wherein the HTS tapes comprise one or more tubes, preferably relatively thin tubes, between- or imbedded in the HTS tapes. These tubes may for example comprise material with a melting point in the temperature span acceptable during a fault, such as one or more of alcohol, methane, CO, $CO_2$, ethane, silane, water and other medium that has an enthalpy-absorbing phase change below a temperature of about 0° C., or preferably below about −50° C. (123 K). In one embodiment the tubes are arranged for increasing the contact surface of the cooling medium.

In one embodiment the power cable of the invention is a coaxial cable comprising at least one conductor comprising one, two, three, four or more layers of HTS-tape, at least one of said HTS-tape layer is at least partly surrounded by said cooling layer and said conductor being surrounded by said electrical insulation.

In one embodiment two or more of said layers of HTS-tape are surrounded by cooling layers, which again are surrounded by electrical insulation(s). For the best solution it is at present believed that it is desirable that all layers of HTS-tape are surrounded by cooling layers, which again are surrounded by electrical insulation(s). The cooling layers may be of same or it may be of different material. It may in one embodiment have essentially same thickness. In another embodiment the thickness of the cooling layer differs, for example the outermost cooling layer may in one embodiment be thinner than one or more cooling layer placed closer to the center axis of a coaxial power cable. In one embodiment comprising a coaxial power cable, such as a tri-axial power cable having a plurality of cooling layers, the thickness of the cooling layers gradually decreases from the center axis and out.

In order to obtain a desirable high cooling effect it is desired that the cooling layer is placed at least very close to the with the HTS-tape, i.e. preferably the distance between the HTS-tape and the cooling layer should not exceed about 10 mm. In one embodiment the distance between the HTS-tape and the cooling layer should not exceed about 5 mm. In one embodiment the distance between the HTS-tape and the cooling layer should not exceed about 1 mm The cooling may in one embodiment be in direct contact with the HTS-tape for thereby provide a very good cooling effect. In one embodiment a film layer—e.g. a film layer having a thickness up to about 2 mm—is placed between the HTS-tape and the cooling layer.

The cooling layer may be of any kind of material, preferably comprising a solid material capable of comprising said fluid cooling medium for example in passages, pores, and/or between layers of the solid material of the cooling layer.

In one embodiment the solid material is in the form of or comprises a solid matrix.

In one embodiment the cooling layer comprises one or more straight or curved passages in which the cooling fluid can pass, e.g. the cooling medium in liquid and/or gas form can pas along said one or more straight or curved passages e.g. to be collected at a desired point.

Generally a power cable will have a length, with a length direction and a cross direction essentially perpendicular to the length direction. In a coaxial power cable the length direction is the direction of the centre axis.

In one embodiment the cooling layer comprises one or more straight or curved passages in the length direction of the cable.

In one embodiment the cooling layer comprises one or more straight or curved passages in the length direction and in the cross direction of the cable.

In one embodiment the cooling layer comprises one or more straight or curved passages in the cross direction of the cable.

The cooling layer may for example be in the form of a porous material having a porous volume, the porous volume preferably being at least about 10% pores by vol., such as at least about 20 vol. % porous volume or such as at least about 40 vol. % porous volume.

The porous material may in one embodiment be at least partly open pored, such as an open pored porous polymer. Any polymer with the need mechanical strength and chemical stability towards the cooling medium may be used, such as polyethylene, polypropylene, nylon, polyaramid, Nomex™, Tyvek™ and Teflon™.

In one embodiment the porous volume may be a woven or non-woven fibrous porous volume. The fibrous material preferably is selected from one or more of polymer fibers, glass fibers, and carbon fibers. Any polymer with the need mechanical strength and chemical stability towards the cooling medium may be used, such as polyethylene, polypropylene, nylon, polyaramid, Nomex™, Tyvek™ and Teflon™.

The porous volume may in one embodiment be capable of expanding. Thereby when an amount of cooling medium in the porous volume evaporates to gas form for providing an additional cooling effect, the porous volume will expand. Thereby the risk of increasing pressure above a selected level will be reduced and the risk of electrically breakdown will accordingly be even further reduced.

In one embodiment the cooling layer is at least partially collapsible.

The porous volume may e.g. be partially compressed (collapsed) in its basic working state, such that when an amount of cooling medium in the porous volume evaporates to gas form for providing an additional cooling effect, the porous volume will expand. Thereby the risk of increasing pressure above a selected level will be reduced and the risk of electrically breakdown will accordingly be even further reduced.

As indicated above the cooling medium in the cooling layer may be in liquid form and/or gas form. During stable operation it is at present desired that at least a part, such as the major part of the cooling medium is in liquid form and preferably essentially all of the cooling medium in the cooling layer during stable operation is in liquid form.

When the power cable is in a fault condition, such as overheating (often a local overheating), a pressure increase, an electric overload, and/or a too high temperature of the cooling medium e.g. due to error in the cooling system (cryostat), at least a part of the cooling medium in the cooling layer will evaporate to reduce the risk of electrically breakdown and accordingly during fault condition at least a part of the cooling medium may be in gas form.

An electrical insulation is provided to at least partly surround the cooling layer.

In one embodiment where the power cable is a coaxial power cable an electrical insulation is applied in a coaxial structure to surround the cooling layer which again surrounds one or more HTS-tapes applied in a coaxial structure to provide a conductor.

In one embodiment where the power cable is a coaxial power cable comprising two or more conductors comprising one or more HTS-tapes, each conductor is surrounded by a cooling layer and an electrical insulation.

The cooling layer and the electrical insulation may in one embodiment be in direct contact with each other.

In one embodiment the cooling layer and the electrical insulation may be separated from each other e.g. by one or more film layers and/or by one or more membranes as explained further below.

The electrical insulation may be of any kind of material non electrical conductive material, preferably comprising a solid material capable of comprising said fluid cooling medium for example in passages, pores, and/or between layers of the solid material of the cooling layer.

In one embodiment the electrical insulation is in the form of or comprises a solid matrix.

In one embodiment the electrical insulation comprises one or more straight or curved passages in which the cooling fluid can pass, e.g. the cooling medium in liquid and/or gas form can pas along said one or more straight or curved passages. Thereby the electrical insulation will be simple to impregnate with the cooling medium.

In one embodiment the electrical insulation comprises one or more straight or curved passages in the length direction of the cable.

In one embodiment the electrical insulation comprises one or more straight or curved passages in the length direction and in the cross direction of the cable.

In one embodiment the electrical insulation comprises one or more straight or curved passages in the cross direction of the cable.

The electrical insulation may for example be in the form of a porous material having a porous volume, the porous volume of the electrical insulation preferably being at least about 2% pores by vol., such as at least about 5 vol. % porous volume, such as at least about 10 vol. % porous volume, such as at least about 20 vol. % porous volume or such as at least about 40 vol. % porous volume.

The porous material of the electrical insulation may in one embodiment be at least partly open pored, such as an open pored porous polymer. Any polymer with the need mechanical strength and chemical stability towards the cooling medium may be used, such as polyethylene, polypropylene, nylon, polyaramid, Nomex™, Tyvek™ and Teflon™.

In one embodiment the porous volume of the electrical insulation may be a woven or non-woven fibrous porous volume. The fibrous material preferably is selected from one or more of polymer fibers, glass fibers, and carbon fibers. Any polymer with the need mechanical strength and chemical stability towards the cooling medium may be used, such as polyethylene, polypropylene, nylon, polyaramid, Nomex™, Tyvek™ and Teflon™.

The electrical insulation may in one embodiment be in the form of wound film e.g. wound film strips, the passages being provided between the layers. The electrical insulation in the form of wound film may for example be made of polymer e.g. the polymers mentioned above. In one embodiment the electrical insulation in the form of wound film is of a fibrous material e.g. ad described above.

The electrical insulation and the cooling layer may be of the same or it may be of a different material.

The electrical insulation is at least partly impregnated with the fluid cooling medium. Thereby a very good insulation can be provided. However it is desired that the cooling medium in the electrical insulation is essentially in liquid form only. Thereby the risk of electrically breakdown due to fault may be further reduced In one embodiment wherein the cooling medium in the cooling layer is at least partly in gas form, the cooling layer and said electrical insulation being arranged such that said generated gas essentially does not flow into said electrical insulation.

This may for example be provided by the selection of material for respectively the cooling layer and the electrical insulation. For example the material for the electrical insulation may have another surface tension than the material for the cooling layer.

In one embodiment electrical insulation has a surface tension which is closer to the surface tension of the cooling medium in liquid form than the surface tension of the material for the cooling layer.

In one embodiment electrical insulation has a lower porosity than the porosity the cooling layer.

In one embodiment the material of the electrical insulation is less expansible than the material of the cooling layer.

In one embodiment the material of the electrical insulation has an average pore size which is smaller than the pore size of the material of the cooling layer.

In one embodiment the material of the electrical insulation has a lover affinity for nitrogen in gas form than the material of the cooling layer.

In one embodiment wherein the cooling medium in the cooling layer is at least partly in gas form, and the gas is generated from evaporation of cooling medium in liquid form, the cooling layer and said electrical insulation is arranged such that the generated gas essentially does not flow into said electrical insulation until the pressure in the cooling layer exceeds a predetermined pressure above the normal operating pressure, such as at least about 0.5 bars above the normal operating pressure or at least about 3 bars above the normal operating pressure, the normal operating pressure preferably being above atmospheric pressure, such as at least about 3 bars or at least about 6 bars absolute pressure.

In one embodiment wherein the cooling medium in the cooling layer is at least partly in gas form, and the gas is generated from evaporation of cooling medium in liquid form, the cooling layer and said electrical insulation is arranged such that the generated gas essentially does not flow into said electrical insulation until the temperature in said cooling layer exceeds a predetermined temperature such as at least about 90 K, this temperature limit preferably being a predetermined number of degrees above the normal operating temperature, for example at least about 5 K above, such as at least about 10 K above or at least about 15 K above the normal operating temperature.

The cooling layer may in one embodiment comprises an escape opening for allowing at least a part of the generated gas to escape, said escape opening preferably being manually, computer controlled and/or automatically adjustable.

The escape opening may for example lead into a collecting chamber for collection and optionally condensing the cooling fluid. In another embodiment the escape opening allow the cooling medium to escape from the power cable to the environment.

In one embodiment the power cable comprises at least one gas collecting element arranged in fluidic communication with the cooling layer to collect gas generated from liquid cooling medium. Such gas collecting element may be arranged at any point along the length of the power cable. The gas collecting element may e.g. be a thermally insulated container.

In one embodiment the power cable comprises at least one thermally insulated container arranged at one end of the power cable and/or along the length of the power cable to collect nitrogen blown out of the system during a fault.

In one embodiment where gas being generated from evaporation of cooling medium in liquid form in the cooling layer, the cooling layer and the electrical insulation are arranged such that the generated gas being mainly distributed in the cooling layer. Preferably the generated gas is only distributed in the cooling layer, whereas the electrical insulation remains essentially free of the generated gas.

In one embodiment where gas being generated from evaporation of cooling medium in liquid form in the cooling layer, the cooling layer and the electrical insulation are arranged such that the generated gas remains in said cooling layer or escape there from via an escape opening.

In one embodiment a phase separating membrane is arranged between the cooling layer and the electrical insulation. The phase separating membrane may preferably provide a resistance against the passing of cooling medium in gas form.

In one embodiment the phase separating membrane provides a resistance against the passing of cooling medium in gas form from the cooling layer to the electrical insulation.

In one embodiment the phase separating membrane essentially prevents gas from flowing from the cooling layer into the electrical insulation.

In one embodiment the phase separating membrane allow liquid cooling medium to pas into said electrical insulation, e.g. from the cooling layer.

In one embodiment the phase separating membrane allow liquid cooling medium to pas from the cooling layer into said electrical insulation and visa verse.

In one embodiment the phase separating membrane allows liquid cooling medium to pass, but not cooling medium in gas form.

In one embodiment the phase separating membrane allows liquid cooling medium to pass, but not cooling medium in gas form at a pressure difference of at least about 0.1 bar, such as at a pressure difference of at least about 0.1 bar, such as at a pressure difference of at least about 0.1 bar, such as at a pressure difference of at least about 0.2 bar, such as at a pressure difference of at least about 0.5 bar, such as at a pressure difference of up to about 5 bars, such as at a pressure difference of up to about 2 bars, such as at a pressure difference of up to about 1 bar.

In one embodiment a phase separating membrane is arranged to surround one or more conductors of the cable, optionally a phase separating membrane being arranged to surround all conductors and all electrical insulations of the cable. The phase separating membrane(s) preferably be arranged to surround the one or more conductors by being placed between respective layers of cooling layer and electrical insulation applied to surround the respective conductors.

I one embodiment the power cable comprises at least one phase separating membrane which allows gas (e.g. generated from the cooling medium) to escape from the cable, but it prevents cooling medium in liquid form to pass the phase separating membrane. Thereby the pressure within the cooling layer can be controlled to avoid an undesired increased pressure and the risk of electrically breakdown may be reduced. As described the pressure within the cooling layer may also be controlled by one or more other features including expanding the cooling layer and/or removing the generated gas in other ways.

In one embodiment the separating membrane allows cooling medium in gas form to escape from the cable, but not cooling medium in liquid form.

In one embodiment the phase separating membrane allows liquid cooling medium to escape from the cable but not cooling medium in gas form at a pressure difference of at least about 0.1 bar, such as at a pressure difference of at least about 0.1 bar, such as at a pressure difference of at least about 0.1 bar, such as at a pressure difference of at least about 0.2 bar, such as at a pressure difference of at least about 0.5 bar, such as at a pressure difference of up to about 5 bars, such as at a pressure difference of up to about 2 bars, such as at a pressure difference of up to about 1 bar.

In one embodiment the power cable comprises a phase separating membrane as its outmost layer of the cable. This outermost phase separating membrane preferably allows a gas (such as nitrogen gas) to pass only.

The phase separating membrane may comprise any materials which can provide the desired separating properties. Examples of materials from which the phase separating membrane can be made include polymers, and fibers of glass and/or carbon. In one embodiment the fluid sensing station comprises a foamed, sintered, woven or non-woven fibrous open pored polymer-, a glass-fiber material, or a carbon-fiber material, preferably the phase separating membrane comprises at least one of polyethylene, polypropylene, nylon, polyaramid, Nomex™, Tyvek™, Teflon™, glass fiber and carbon fiber, such as a Gore-Tex™ phase-separating membrane, where one out of two phases on one side is allowed to pass to the same phase on the other side, at a differential pressure of at least about 0.1 bar, such as at a pressure difference of at least about 0.1 bar, such as at a pressure difference of at least about 0.2 bar, such as at a pressure difference of at least about 0.5 bar, such as at a pressure difference of up to about 5 bars, such as at a pressure difference of up to about 2 bars, such as at a pressure difference of up to about 1 bar.

The cooling layer may in one embodiment be semi conducting, or conductive and surrounded by a semiconductor.

In one embodiment the electric insulation comprises a plurality of electric insulating film layers.

Beyond the cooling medium or preferably as a part of the cooling medium the cooling layer may in one embodiment comprise one or more of alcohol, methane, CO, $CO_2$, ethane, silane, water and other medium that has an enthalpy-absorbing phase change below a temperature of about 0° C., or preferably below about −50° C. (123 K).

The cooling medium may preferably be a cryogenic cooling medium. In one embodiment the cooling medium is nitrogen or a mixture comprising nitrogen, such as a mixture of nitrogen, oxygen and carbon dioxide, preferably with an oxygen content below 16% by mol. to reduce the fire hazard.

BRIEF DESCRIPTION OF DRAWINGS

The invention will be explained more fully below with reference to examples and to the drawings in which.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The figures are schematic and simplified for clarity, and they just show details which are essential to the understanding of the invention, while other details are left out. Throughout, the same reference numerals are used for identical or corresponding parts.

It should be emphasized that the term "comprises/comprising" when used in this specification is taken to specify the presence of stated features, integers, steps or components but does not preclude the presence or addition of one or more other stated features, integers, steps, components or groups thereof.

Figure 2:
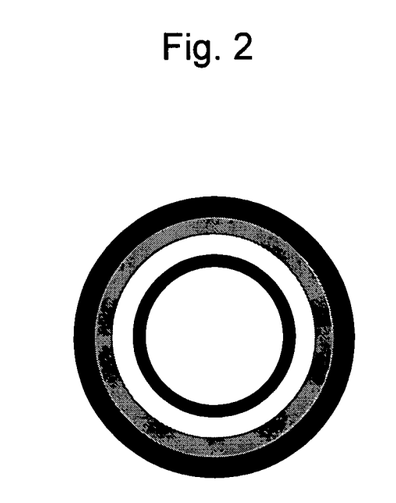
FIG. 2 is a schematic cross-sectional view of a first cable core of a power cable of the invention.

FIG. 2 is a schematic cross-sectional view of a cable core of a coaxial single phase power cable of the invention. The cable core comprises a mechanical core support 1, which is often referred to as a former. Inside the mechanical core support cooling medium may be circulated. Around the mechanical core support is a conductor 2 comprising at least one HTS-tape. Around the conductor is a cooling layer 3 comprising a fluid cooling medium and an electrical insulation 4 at least partly impregnated with the fluid medium. The cooling layer 3 and the electrical insulation 4 is applied in direct contact with each other.

Figure 3:
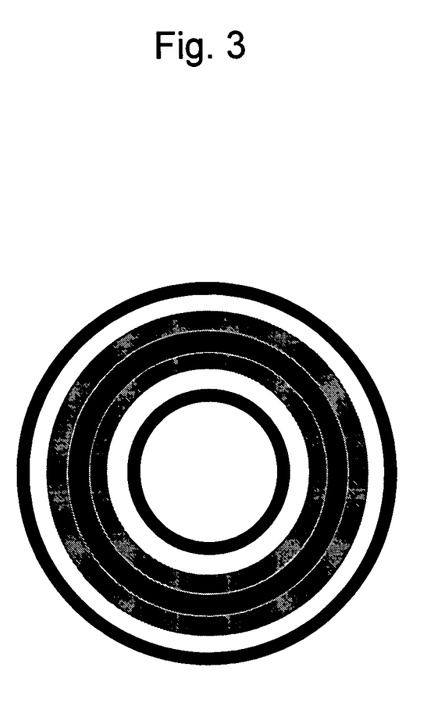
FIG. 3 is a schematic cross-sectional view of a second cable core of a power cable of the invention.

FIG. 3 is a schematic cross-sectional view of a cable core of a coaxial two phase power cable of the invention. The cable core comprises a mechanical core support 11, inside which cooling medium may be circulated. Around the mechanical core support is a first conductor 12a comprising at least one HTS-tape. Around the first conductor 12a is a first cooling layer 13a comprising a fluid cooling medium and an electrical insulation 14 at least partly impregnated with the fluid medium. Around the electrical insulation 14 is a second cooling layer 13b comprising a fluid cooling medium and around the second cooling layer 13b is a second conductor 12b comprising at least one HTS-tape. Also in this embodiment the cooling layers 13a, 13b are applied in direct contact with the electrical insulation 14. In the in FIG. 3 shown embodiment the cable core comprises an outer layer 15, which may be an additional insulation or it may be a further mechanical support. In one embodiment the cable core does not comprise the additional layer 15.

Figure 4:
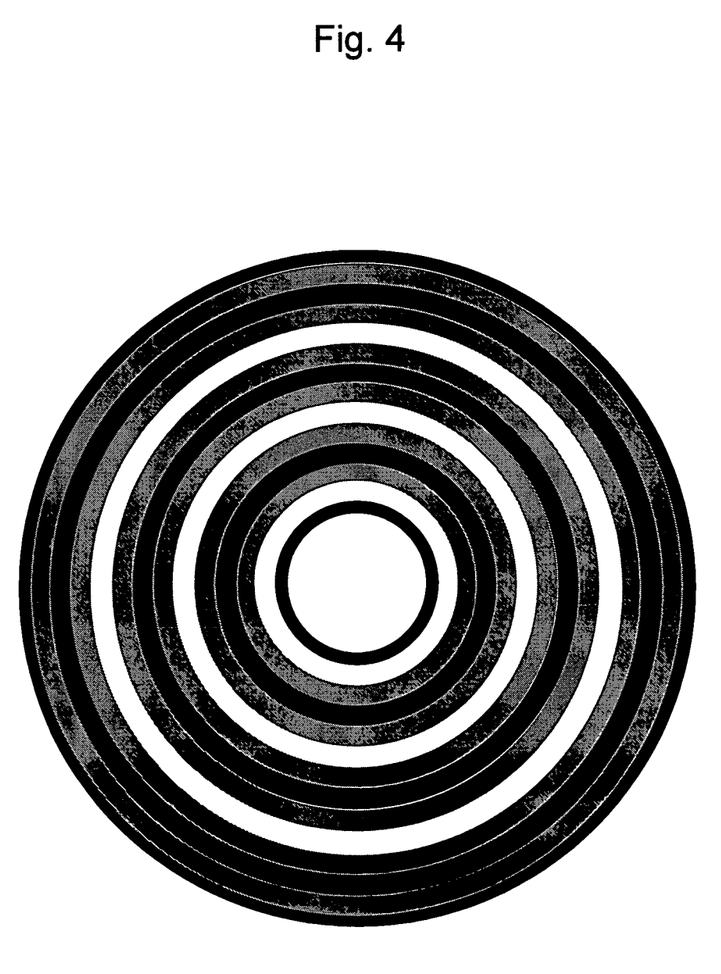
FIG. 4 is a schematic cross-sectional view of a third cable core of a power cable of the invention.

FIG. 4 is a schematic cross-sectional view of a coaxially arranged multi-phase (here triaxial) cable core of a power cable of the invention. The cable core comprises a mechanical core support 21, inside which cooling medium may be circulated. The triaxial cable core comprises three conductors (phases) 22a, 22b, 22c. Each of the conductors are surrounded by a sandwiched layer of a first cooling layer 23a comprising a fluid cooling medium, an electrical insulation 24 at least partly impregnated with the fluid medium and a second cooling layer 23b comprising a fluid cooling medium. The cable core also comprises an outer layer 25, which may be an additional insulation or it may be a further mechanical support. In one embodiment the cable core does not comprise the additional layer 25.

Figure 5:
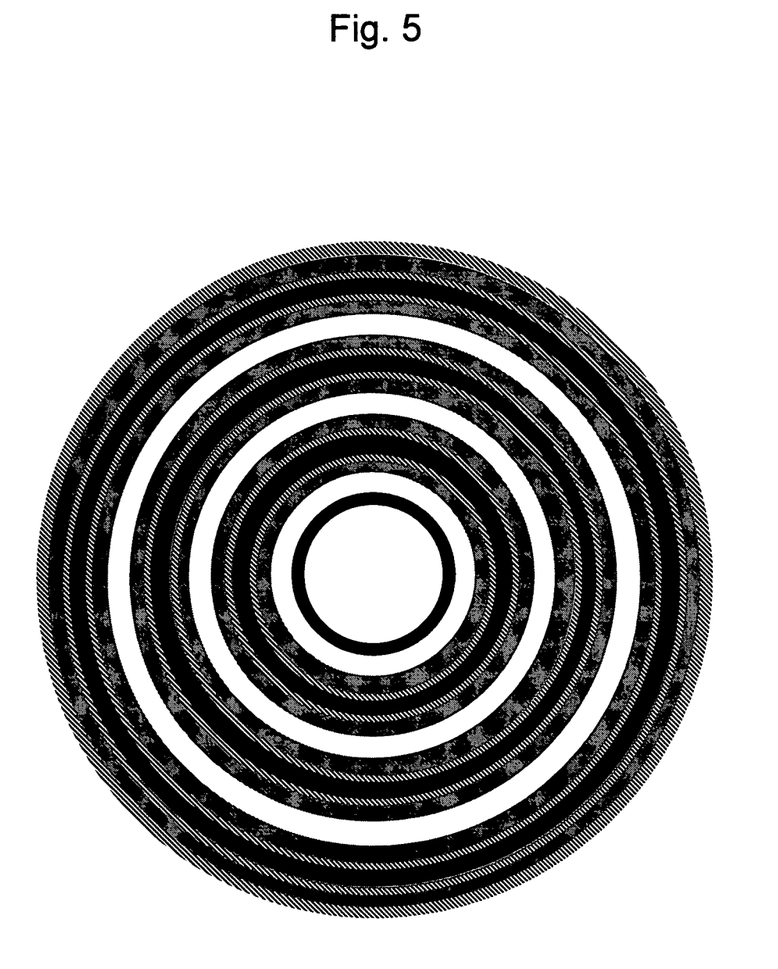
FIG. 5 is a schematic cross-sectional view of a fourth cable core of a power cable of the invention.

FIG. 5 is a schematic cross-sectional view of a fourth cable core of a power cable of the invention which is a variation of the coaxially arranged multi-phase (here triaxial) cable core of a power cable shown in FIG. 4. The cable core of FIG. 5 additionally comprises a plurality of phase separating membranes 26a, 26b, which are arranged to protect the electrical insulations 24 from cooling medium in gas form generated in the cooling layers 23a, 23b. The additional layer 25 in the embodiment shown in FIG. 5 is a phase separating membrane allowing cooling medium in gas form to escape from the cable core.

Figure 6:
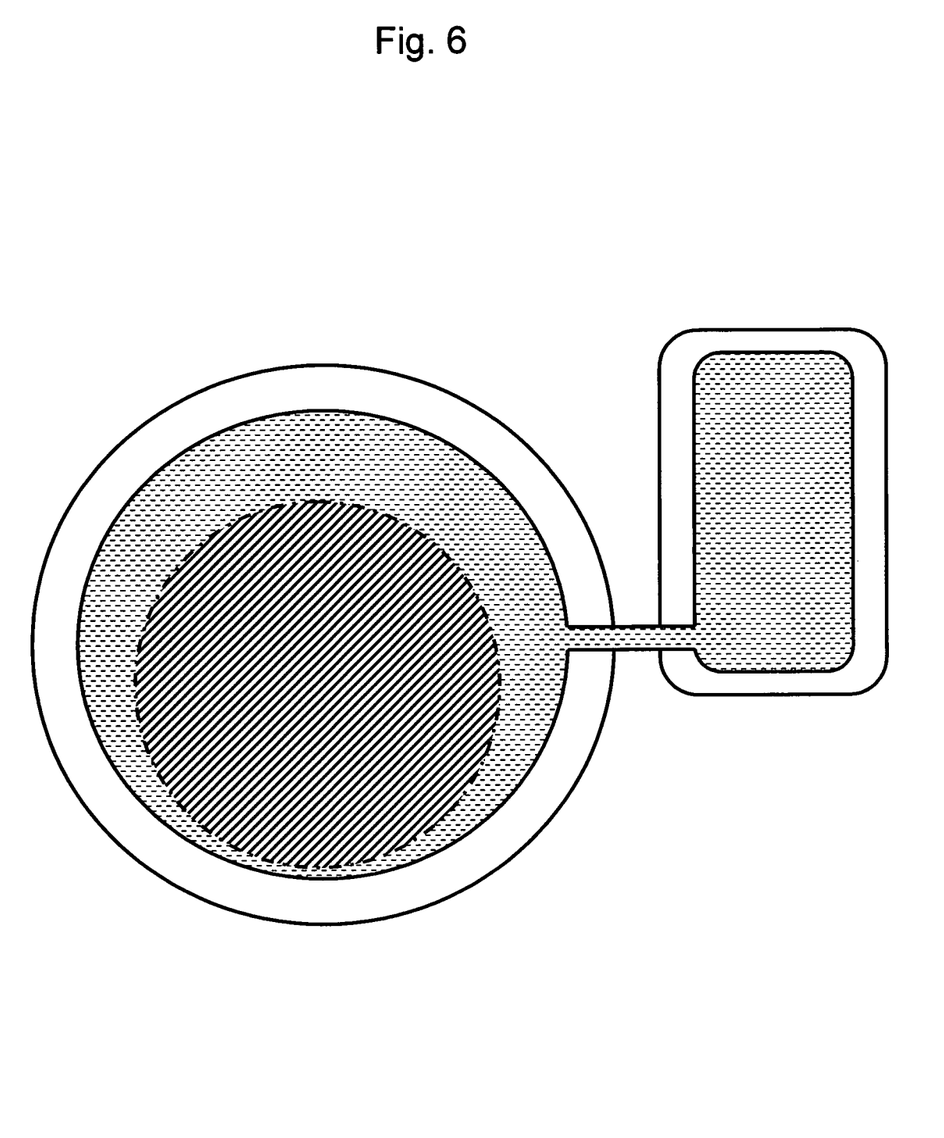
FIG. 6 is a schematic cross-sectional view of a power cable of the invention.

FIG. 6 is a schematic cross-sectional view of a power cable of the invention comprising a cable core 30 for example as the cable cores shown in one of the embodiment of FIG. 2, 3, 4 or 5. The power cable further comprises a cooling volume 31 for circulating cooling medium. The cooling volume 31 may e.g. be free of solids or it may for example comprise a solid matrix in which the cooling medium can be transported. The power cable further comprises a thermal insulation 32. The cooling volume 31 is in fluidic communication with a cryostat 33 for circulating the cooling medium.

In one embodiment the cryostat 33 may be in fluidic communication with the cooling layer for collecting generated cooling medium gas.

EXAMPLES

Power Cable with Expansion Volume and Phase Separator

A power cable of the invention is provided.

In splices and at the terminations, the 2 g HTS conductors can be protected by adding Ic, e.g. with BSCCO tapes.

The physical strength of the cable and terminations should preferably be adequate to sustain the increased pressure when the nitrogen is evaporated. The shield is neutral and can be reinforced without influence on the electric properties of the cable. The reinforcing layer(s) may be steel, carbon fiber or Kevlar. The width of the reinforcement tapes may preferably be at least half the cable diameter and they shall be overlapped to maximize the strength. Alternatively, the reinforcement can be interlocked.

Thermal insulated containers at the ends and along the length of the cable may collect the nitrogen blown out of the system during a fault.

The increase in pressure may in one embodiment be limited by one or more of the following means:

- Enlarge the heat capacity of the HTS tapes. If this reduces the resistance of the tapes, a longer cable may be needed to maintain the same current reduction. Alternatively, the pitch of the HTS tapes can be reduced, and insulation added between the tapes.
- Adding a material with a melting point in the temperature span acceptable during a fault. The fusing heat will absorb some of the energy which otherwise would be dissipated in the nitrogen. This could be alcohol, methane, CO, ethane, silane, or similar. The material can be provided in thin tubes between- or imbedded in the HTS tapes.
- A collapsible volume that sustains operating pressure, but collapses when the pressure is increased due to a fault. It could be a thermal insulated heated gas volume. The gas volume can be heated by the leakage heat from the cryostat, or by an active (e.g. electric or inductive) heater.

If the outmost layer of the cable is a phase separating membrane which allows nitrogen gas to pass only, the cable can be cooled by supplying liquid nitrogen inside the cable and letting it evaporate on the outside of the cable. This leaves a gas volume around the cable, which can be compressed during a fault.

The recovery time needed after a fault depends on the total amount of energy dissipated in the cable. The evaporated nitrogen needs to be condensed, and the HTS tapes cooled to operating temperature. If only a part of the cable system is current limiting, it should be downstream in the cooling flow in order to minimize the recovery time. Alternative, the flow can be reversed in one or more of the flow tubes.

HTS Power Cable

The HTS power cable is an example of a 50 kV, 250 MVA HTS Cable of the invention with Current-limiting properties. The cable was produced for NUON.

The cable had the following features:
4 kA 13.2 kV (7.6 kVPh-Gnd) FCL-HTS cable, 215 m
95 A Ic 2 g tapes, steel laminated
120 tapes per phase
High current properties for AMSC 344S tapes:
320 mVRMS/cmtape @ 355 APeak/tape
After 100 ms:
320 mVRMS/cmtape @ 80 ARMS/tape
For 215 meter cable with 120 tapes per phase:
6.9 kVRMS @ 42.6 kAPeak per phase
In a stiff grid (worst case), a 100 ms fault will dissipate 19.4 MJ in the cable. With 5 kW excessive cooling capacity, the recovery time is about one hour.

About 970 g nitrogen will evaporate per meter cable.

Cable Protection System

Figure 1:
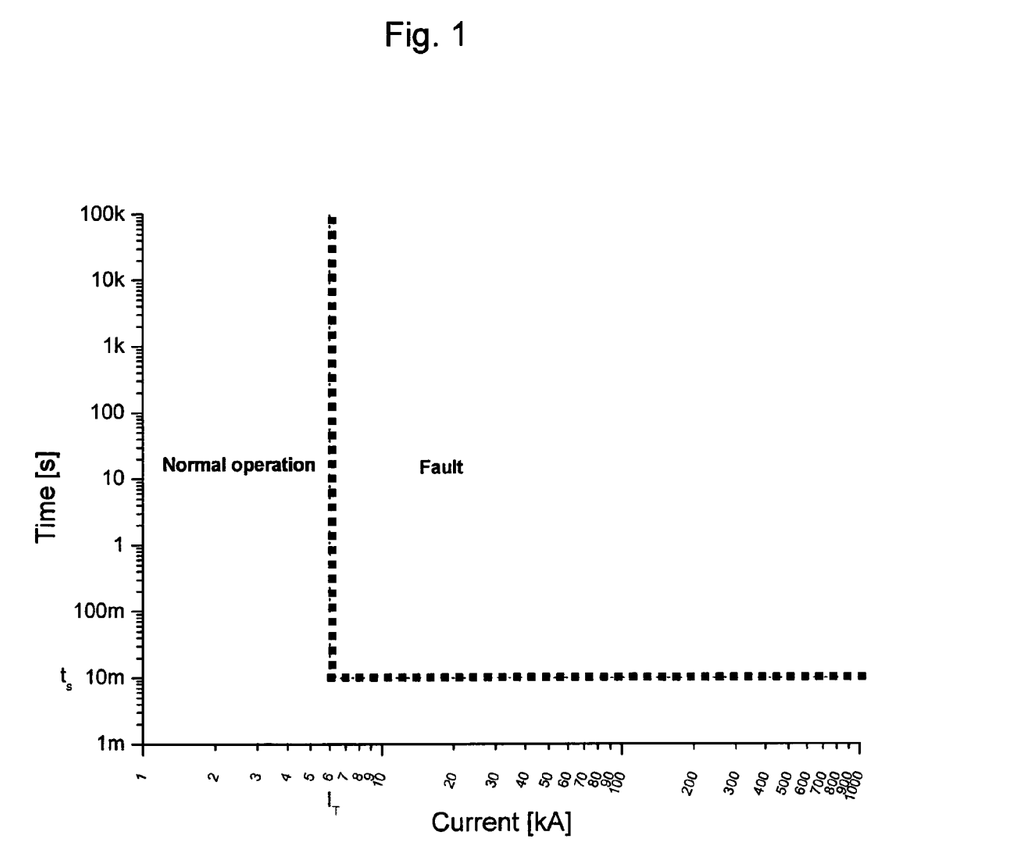
FIG. 1 shows an operating mode of a HTS cable disclosed in an example.

The HTS cable system in his example operates in two modes only. At currents below the stabile load-level, the cable is in normal operation. At any current exceeding the stabile load-level, is considered a fault and the cable is to be disconnected immediately or after a predetermined time delay, ts. The stabile load-level, $I_T$ is dependent of the operating temperature. FIG. 1 shows the operating modes of the HTS cable.

The voltage along the length of the cable may be used directly to trigger the protecting breaker.

The HTS cable system has no short-duration or intermittent operating conditions.

The time needed for temperature recovery depends on the total amount of energy dissipated in the cable. This can be monitored during the fault, and the recovery time calculated immediately.

What is claimed is:

1. A power cable comprising, at least one HTS-tape and a cooling system comprising a fluid cooling medium for cooling the at least one HTS-tape, said at least one HTS-tape being at least partly surrounded by a cooling layer comprising said fluid cooling medium, and an electrical insulation at least partly impregnated with said fluid medium, wherein said electrical insulation has a lower porosity than the porosity of said cooling layer.

2. A power cable as claimed in claim 1, wherein said cable being a coaxial cable comprising at least one conductor comprising one, two, three, four or more layers of HTS-tape, at least one of said HTS-tape layers being at least partly surrounded by said cooling layer and said conductor being surrounded by said electrical insulation.

3. A power cable as claimed in claim 2, wherein two or more of said layers of HTS-tape being surrounded by said cooling layer.

4. A power cable as claimed in claim 1, wherein said cooling layer being in direct contact with said HTS-tape.

5. A power cable as claimed in claim 1, wherein said cable has a length direction and a cross direction essentially perpendicular to the length direction, said cooling layer comprises one or more straight or curved passages in the length direction or in the cross direction of the cable, wherein the cooling fluid can pass in said passages.

6. A power cable as claimed in claim 1, wherein said cooling layer being in the form of a material having a porous volume.

7. A power cable as claimed in claim 6, wherein said porous volume being at least about 10 pores % by vol.

8. A power cable as claimed in claim 6, wherein the porous volume being a foamed open pored polymer, a woven or non-woven fibrous porous volume.

9. A power cable as claimed in claim 8, wherein the foamed polymer is selected from the group of polyethylene, polypropylene, nylon, polyaramid, Nomex™, Tyvek™ and Teflon™.

10. A power cable as claimed in claim 8, wherein the fibrous porous volume comprises a fibrous material selected from the group of glass fibers, carbon fibers, polyethylene fibers, polypropylene fibers, nylon fibers, polyaramid fibers, Nomex™ fibers, Tyvek™ fibers and Teflon™ fibers.

11. A power cable as claimed in claim 1, wherein said cooling medium in said cooling layer being at least partly in gas form, said gas being generated from evaporation of cooling medium in liquid form, said cooling layer and said electrical insulation being arranged such that said generated gas essentially does not flow into said electrical insulation until the pressure in said cooling layer exceeds a predetermined pressure above the normal operating pressure.

12. A power cable as claimed in claim 11, wherein said predetermined pressure is at least about 0.5 bars above the normal operating pressure or at least about 3 bars above the normal operating pressure, and wherein said normal operating pressure is a pressure above atmospheric pressure, a pressure at least about 3 bars absolute pressure, or a pressure at least about 6 bars absolute pressure.

13. A power cable as claimed in claim 1, wherein said cooling medium in said cooling layer being at least partly in gas form, said gas being generated from evaporation of cooling medium in liquid form, said cooling layer and said electrical insulation being arranged such that said generated gas essentially does not flow into said electrical insulation until the temperature in said cooling layer exceeds a predetermined temperature.

14. A power cable as claimed in claim 13, wherein said predetermined temperature is at least about 90 K.

15. A power cable as claimed in claim 13, wherein said temperature limit is being a predetermined number of degrees above the normal operating temperature, wherein said predetermined number of degrees is selected from the group of at least about 5 K above, at least about 10 K above, or at least about 15 K above the normal operating temperature.

16. A power cable as claimed in claim 1, wherein said cooling medium in said cooling layer being at least partly in gas form, said gas being generated from evaporation of cooling medium in liquid form, said cooling layer comprises an escape opening for allowing at least a part of the generated gas to escape.

17. A power cable as claimed in claim 16, wherein said escape opening being manually, computer controlled or automatically adjustable.

18. A power cable as claimed in claim 16, wherein said escape opening lead into a collecting chamber for collecting said cooling fluid.

19. A power cable as claimed in claim 16, wherein said escape opening lead into a collecting chamber for collection and condensing said cooling fluid.

20. A power cable as claimed in claim 1, wherein said cooling medium in said cooling layer being at least partly in gas form, said gas being generated from evaporation of cooling medium in liquid form, said cooling layer and said electrical insulation being arranged such that said generated gas being distributed in said cooling layer.

21. A power cable as claimed in claim 1, wherein a phase separating membrane being arranged between said cooling layer and said electrical insulation, wherein said phase separating membrane allows liquid cooling medium to pass, but not cooling medium in gas form, said phase separating membrane preventing gas from flowing into said electrical insulation and allows liquid cooling medium to pass into said electrical insulation.

22. A power cable as claimed in claim 1, wherein a phase separating membrane being arranged to surround one or more conductors of the cable, wherein said phase separating membrane allows cooling medium in gas form to pass but not cooling medium in liquid form.

23. A power cable as claimed in claim 22, wherein said phase separating membrane as its outmost layer of the cable, and allows gas to escape from the cable, but prevent cooling medium in liquid form to escape from the cable.

24. A power cable as claimed in claim 21 or 22, wherein the phase separating membrane comprises polymer material, a glass-fiber material or carbon material, where one out of two phases on one side is allowed to pass to the same phase on the other side, at a differential pressure of at least about 0.1 bar.

25. A power cable as claimed in claim 24, wherein the phase separating membrane comprises a material selected from the group of a foamed polymer, a sintered polymer, a woven or a non-woven fibrous open pored polymer, polyethylene, polypropylene, nylon, polyaramid, Nomex™, Tyvek™, Teflon™.

26. A power cable as claimed in claim 1, wherein the cooling layer is semi conducting, or conductive and surrounded by a semiconductor.

27. A power cable as claimed in claim 1, wherein the electric insulation comprises a plurality of electric insulating film layers.

28. A power cable as claimed in claim 1, wherein the cooling layer comprises one or more of alcohol, methane, CO, CO2, ethane, silane, water and other medium that has an enthalpy-absorbing phase change below a temperature of about 0° C.

29. A power cable as claimed in claim 1, wherein the cooling medium is nitrogen or a mixture comprising nitrogen.

30. A power cable as claimed in claim 29, wherein mixture comprising nitrogen comprises nitrogen, oxygen and carbon dioxide, with an oxygen content below 16% by mol to reduce the fire hazard.

31. A power cable as claimed in claim 1, wherein the HTS tapes comprise one or more tubes between- or imbedded in the HTS tapes.

32. A power cable as claimed in claim 1, wherein the cooling layer is at least partially collapsible.

33. A power cable as claimed in claim 1, comprising at least one thermally insulated container arranged at one end of the power cable or along the length of the power cable to collect nitrogen blown out of the system during a fault.

* * * * *

UNITED STATES PATENT AND TRADEMARK OFFICE
CERTIFICATE OF CORRECTION

PATENT NO. : 8,442,605 B2  Page 1 of 1
APPLICATION NO. : 12/602875
DATED : May 14, 2013
INVENTOR(S) : Willen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this
Eighth Day of September, 2015

Michelle K. Lee
*Director of the United States Patent and Trademark Office*